(12) United States Patent
Bernasconi

(10) Patent No.: US 7,660,963 B2
(45) Date of Patent: Feb. 9, 2010

(54) INTERFACE DEVICE FOR DEBUGGING AND/OR TRACING A COMPUTER SYSTEM COMPRISING ONE OR MULTIPLE MASTERS AND ONE OR MULTIPLE SLAVES WORKING TOGETHER

(75) Inventor: Eric Bernasconi, Vence (FR)

(73) Assignee: NXP B.V., Eindhoven (NL)

( * ) Notice: Subject to any disclaimer, the term of this patent is extended or adjusted under 35 U.S.C. 154(b) by 425 days.

(21) Appl. No.: 11/629,897

(22) PCT Filed: Jun. 8, 2005

(86) PCT No.: PCT/IB2005/051873

§ 371 (c)(1),
(2), (4) Date: Dec. 14, 2006

(87) PCT Pub. No.: WO2005/124556

PCT Pub. Date: Dec. 29, 2005

(65) Prior Publication Data

US 2008/0046674 A1 Feb. 21, 2008

(30) Foreign Application Priority Data

Jun. 14, 2004 (EP) .................................. 04300375

(51) Int. Cl.
 *G06F 12/02* (2006.01)
(52) U.S. Cl. ...................................... 711/171; 711/147
(58) Field of Classification Search .................. 711/171; 714/E11.207, E11.212
See application file for complete search history.

(56) References Cited

U.S. PATENT DOCUMENTS

| | | | |
|---|---|---|---|
| 4,603,382 A * | 7/1986 | Cole et al. ..................... 710/56 |
| 5,642,478 A * | 6/1997 | Chen et al. ..................... 714/45 |
| 5,848,264 A | 12/1998 | Baird et al. | |
| 6,259,698 B1 * | 7/2001 | Shin et al. ................. 370/395.7 |
| 6,408,433 B1 | 6/2002 | Click, Jr. et al. | |
| 6,678,813 B1 * | 1/2004 | Le ............................. 711/172 |
| 6,717,954 B1 * | 4/2004 | Joh ........................... 370/473 |
| 7,110,373 B2 | 9/2006 | Lee | |
| 2003/0002439 A1 * | 1/2003 | Lee et al. ..................... 370/229 |
| 2003/0043830 A1 * | 3/2003 | Floyd et al. .................. 370/412 |
| 2003/0163619 A1 * | 8/2003 | Saito ........................... 710/56 |
| 2003/0206475 A1 * | 11/2003 | Duh et al. .................... 365/221 |
| 2004/0059525 A1 | 3/2004 | Davis | |

FOREIGN PATENT DOCUMENTS

| | | |
|---|---|---|
| CN | 1271889 A | 11/2000 |
| CN | 1430440 A | 7/2003 |
| GB | 2 181 926 A | 4/1987 |

* cited by examiner

Primary Examiner—Matt Kim
Assistant Examiner—Michael C Krofcheck

(57) ABSTRACT

An interface device (D) is dedicated to debugging and/or tracing in a computer system (CS) comprising at least one master (M1, M2, M3) working with at least one slave (SLj) adapted to be readable and writable at chosen addresses, each master being adapted to execute tasks and to deliver slave addresses for reading and/or writing purposes. This interface device (D) comprises i) a group of first FIFO memories (SMi) each assigned to one master for storing data representative of the tasks it executes, ii) a group of dynamically allocatable second FIFO memories (DFk) linkable to one another and to the first FIFO memories (SFi), and iii) processing means (PM) arranged to compute dynamically the FIFO memory size required by each master at a given time, considering the tasks it is executing, and to allocate dynamically a number of second FIFO memories (DFk) to each master chosen according to the corresponding computed FIFO memory size.

20 Claims, 1 Drawing Sheet

INTERFACE DEVICE FOR DEBUGGING AND/OR TRACING A COMPUTER SYSTEM COMPRISING ONE OR MULTIPLE MASTERS AND ONE OR MULTIPLE SLAVES WORKING TOGETHER

FIELD OF THE INVENTION

The present invention relates to computer systems (or devices) comprising at least one master and at least one slave working together, and more precisely to tracing and/or debugging in such computer systems.

"Slave" is meant to be understood here as a computer component having one or more addresses and adapted to store data and to be readable. Such a component may be a block of registers, an interface comprising input and output ports, an UART, a SPI, an I2C or a timer, for instance. Moreover, "master" is meant to be understood here as a computer component adapted to execute tasks and to deliver slave addresses for reading and/or writing purposes. Such a component may be a microprocessor, a Direct Memory Access controller (or DMA), a host interface, or a LCD driver, for instance.

BACKGROUND OF THE INVENTION

As it is known by one skilled in the art, when a new computer system is designed it generally comprises defaults and/or bugs that need to be eliminated. In a computer system having a single master (such as a microprocessor, for instance) it is now an "easy" task to find the source or cause of a bug or error with a dedicated tool such as ETM ("Embedded Trace Module") produced by ARM ltd. Indeed, the master and the slaves being connected to a main bus, it is possible to observe and control, through FIFO ("First In First Out") memories, all kind of transfer on this main bus by connecting the dedicated tool to the system core pins.

In a computer system having several masters, such as a "multilayer ahb architecture" or a "parallelism architecture", debugging and tracing are much more difficult because of the increasing number of masters and slaves to observe and control and/or the fact that several masters may work independently so that it becomes difficult to know what a master is doing towards the other masters. Moreover, in certain circumstances the internal speed of the system core may become so high that an overflow may occur in the FIFO memory assigned to one of the masters.

To solve this drawback it could be possible to assign a FIFO memory having a big size to each master, but this would required a very extensive area on the board, which is rarely available.

SUMMARY OF THE INVENTION

So, the object of this invention is to improve the situation.

For this purpose, it provides an interface device (or dedicated tool) for a computer system comprising at least one master working with at least one slave adapted to be readable and writable at chosen addresses, each master being arranged to execute tasks and delivering at least slave addresses for reading and/or writing purposes.

This interface device is characterized in that it comprises:
a group of first FIFO memories each assigned to one of the masters for storing data representative of the tasks they respectively execute,
a group of dynamically allocatable second FIFO memories, linkable to one another and to the first FIFO memories, and processing means arranged to compute dynamically the FIFO memory size required by each master at a given time, considering the tasks it is executing, and to allocate dynamically to each master a number of second FIFO memories chosen according to the corresponding computed FIFO memory size.

The interface device (or dedicated tool) according to the invention may include additional characteristics considered separately or combined, and notably:
its processing means may be arranged to analyse the occupancy rate of each first and second FIFO memory assigned and/or allocated to each master in order to compute dynamically each required FIFO memory size. In this case, the processing means is preferably arranged to analyse the occupancy rates by comparing each of them to a chosen threshold; the allocation of at least one chosen second FIFO memory to one chosen master being decided when the corresponding occupancy rate is greater than the threshold,
when the second FIFO memories have different sizes, the processing means may be arranged to determine the second FIFO memories to allocate dynamically as a function of their respective sizes and of a working parameter representative of the processing speed,
the processing means may be arranged, when the second FIFO memory allocation needs for at least two masters are greater than the number of (remaining) second FIFO memories not yet allocated, to allocate these remaining second FIFO memorie(s) according to a chosen priority mechanism,
the processing means may be arranged to work in a "tracing mode" to store data representative of master control signals (and optionally slave responses through the master it works with) in the first and second FIFO memories and to provide these stored data on outputs to free the place they occupy in the first and second FIFO memories,
the processing means may be arranged to work in a "debugging mode" to provide data representative of master control signals (and optionally slave responses) stored in the first and second FIFO memories, for the purpose of comparing the master activity,
the processing means may be arranged to provide data on each rising edge and/or each falling edge of an internal clock.

The invention also provides a computer system (or circuit) comprising at least one master working with at least one slave adapted to be readable and writable at chosen addresses, each master being arranged to execute tasks and to deliver slave addresses for reading and/or writing purposes, and an interface device such as the one introduced above.

BRIEF DESCRIPTION OF THE DRAWINGS

Other features and advantages of the invention will become apparent on examining the detailed specifications hereafter and the appended drawings, wherein.

The appended drawings may not only serve to complete the invention, but also to contribute to its definition, if need be.

DESCRIPTION OF THE PREFERRED EMBODIMENTS

Figure 1:
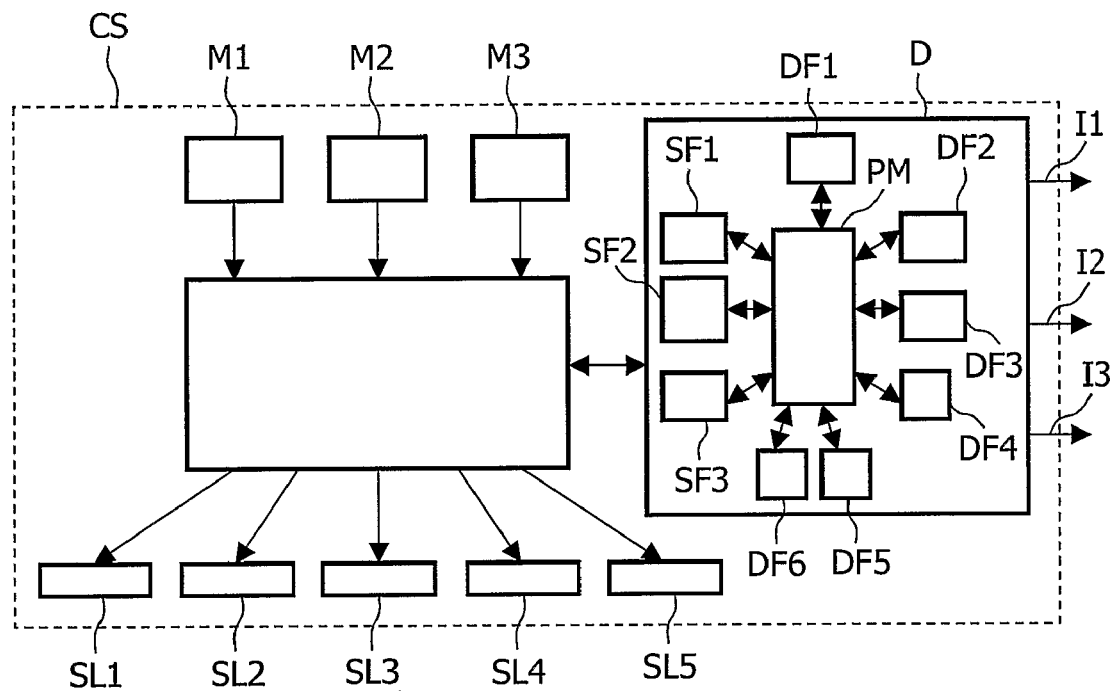
FIG. 1 schematically illustrates a computer system provided with an interface device according to the invention, for debug and/or trace purposes, FIG. 2 schematically illustrates an example of dynamic allocation of a FIFO memory according to the invention, and FIG. 3 schematically illustrates an example of dynamic reallocation of the FIFO memories illustrated in FIG. 2.

Reference is initially made to FIG. 1 to describe an example of computer system CS provided with an interface device D according to the invention in a non limiting embodiment.

In the following description it will be considered that the illustrated computer system CS comprises a multilayer ahb architecture. As illustrated, a multilayer ahb is a core system comprising at least one master Mi (here i=1 to 3, but it must be greater than or equal to 1) connected to a main bus and a group of at least one ahb slave SLj (here j=1 to 5, but it must be greater than or equal to 1) also connected to the main bus. This multilayer ahb is arranged to act as a kind of switch box able to switch the bus connection of the master(s) and slave(s) according to the moment needs.

In the following description it will be considered, for example, that the masters Mi are microprocessors. But a master may also be a host interface or a LCD driver, for instance. An ahb slave SLj may be an UART, an SPI, an I2C, a (block of) register(s), or a timer, for instance.

It is important to notice that the invention is not limited to computer systems having a multilayer ahb architecture. Indeed this invention may also applied to any computer system comprising a parallel architecture in which several masters (at least two) are respectively connected to different buses in an independent way.

The invention provides an interface device (or dedicated tool) D to observe and control the data transmitted through the main bus and outputted by the ahb masters Mi and relative to the ahb slaves SLj, for debugging and/or tracing purposes.

For this purpose, the interface device D comprises a group of pins connected to chosen pins of the multilayer ahb (or core system). This interface device D may be installed on the same board that the multilayer ahb has, their respective pins being connected through conductive strips of a printed circuit.

The interface device D also comprises a group of "static" FIFO memories SFi, a group of "dynamic" FIFO memories DFk (here k=1 to 6, but it may be equal to or greater than 1), and a processing module PM coupled to the static SFi and dynamic DFk FIFO memories.

The static FIFO memories SFi are each respectively assigned to one of the ahb masters Mi for storing the data it outputs, which are representative of its activity (or the tasks it executes).

The dynamic FIFO memories DFk are adapted to be dynamically linked to one another and/or to a static FIFO memory SFi in order to be allocated to the corresponding ahb master Mi, on demand.

The static SFi and dynamic DFk FIFO memories are provided to allow retrieving of the data outputted by the ahb masters Mi.

At a given time the activity of one ahb master Mi may be much more important than the activity of one or more other ahb masters Mi'. So, the FIFO memory sizes that are effectively required for storing data representative of the ahb master activities may vary from one ahb master to the other at a given time. For this purpose the processing module PM is in charge of the dynamic computation of the FIFO memory size that is required for each ahb master Mi at a given time considering its activity (or the tasks it executes). It is also in charge of the dynamic allocation to each ahb master Mi of a number of dynamic FIFO memories DFk that is chosen according to the FIFO memory size it has just computed for it.

In order to compute the FIFO memory sizes the processing module PM analyses in real time the occupancy rate of each static FIFO memory SFi that is assigned to each ahb master Mi and of each dynamic FIFO memory DFk that is eventually allocated to each master Mi. For instance, the processing module PM compares in real time each occupancy rate to a chosen threshold. This threshold may be equal to 90%, for instance. The chosen threshold may be the same for each master, but it may also vary from one master to another. Moreover, the threshold(s) may be adjustable. If the occupancy rate of a static SFi or dynamic DFk FIFO memory, which is assigned or allocated to an ahb master Mi, becomes greater than the associated threshold, the processing module PM considers that the activity of this ahb master Mi requires more FIFO memory. So, it allocates at least one (other) chosen dynamic FIFO memory DFk to the ahb master Mi in order to avoid a memory overflow.

The number of dynamic FIFO memories DFk to be allocated depends on the FIFO memory size required. But, it may also depend on a working parameter representative of the processing speed.

The sizes of the dynamic FIFO memories DFk are preferably the same. But this is not mandatory.

The size (or depth) of a FIFO memory will define the minimum granularity that can be allocated to each ahb master Mi. If the granularity is high then less multiplexes could be implemented and one can expect to reach a high frequency. But, if every time a huge (or large) dynamic FIFO memory DFk is used to increase the FIFO size allocated to an ahb master Mi, one may use only a (small) part of it or even nothing. On the other hand, if dynamic FIFO memories DFk are used having small sizes (or depths), it becomes possible to adapt very precisely the required FIFO memory sizes in real time without allocating FIFO memory spaces that could be allocated to other ahb masters Mi. But in this case the maximum processing speed will be decrease.

When the dynamic FIFO memories DFk have different sizes, it is preferable to first choose the dynamic FIFO memory sizes (or depths) according to the chosen speed parameter and then the number of dynamic FIFO memories DFk adapted to the computed dynamic FIFO memory sizes.

Moreover, the number of dynamic FIFO memories DFk to be allocated may also depend on the dynamic FIFO memories which have not yet been allocated. Indeed, it may occur that the dynamic FIFO memory allocation needs (in term of size) computed by the processing module PM, became greater than the available dynamic FIFO memory size. In this case the processing module PM may allocate the remaining dynamic FIFO memory(ies) DFk according to a chosen priority mechanism.

For instance, the priority mechanism may comprise in allocating a remaining dynamic FIFO memory DFi to the first master Mi for which exceeding of the threshold has been detected during the last bus observation window. A first alternative priority mechanism may comprise in allocating a remaining dynamic FIFO memory DFi to the master Mi having the highest priority. A second alternative priority mechanism may comprise in allocating a remaining dynamic FIFO memory DFi to the master Mi having used the biggest bandwidth during the last bus observation window (this requires a bus profiling). It is also possible to combine at least two of the priority mechanisms cited above.

It is important to notice that a priority mechanism is used in case of a conflict between FIFO memories allocated to different masters occurs during the same bus observation window. By <<conflict>> is meant threshold exceedings having approximately the same value (or percentage).

It is important to notice that when the processing module PM detects that a dynamic FIFO memory DFk is empty and then no longer useful for the data storage of a master, it can immediately reallocate it to another master according to the current needs.

To retrieve the data from the FIFO memories SFi and DFk one output channel Ii of the interface device D may be assigned to each ahb master Mi. By "output channel Ii" is meant here a chosen group (or bunch) of pins. But in order to reduce the number of pins it is also possible to time-multiplex the data from the FIFO memories SFi and DFk, especially when the data rate is not too high. But in this case it is mandatory to use an external demultiplexer to recover the time-multiplexed data.

As mentioned above, the interface device D may work in debugging and/or tracing mode(s).

It is recall that the debugging mode aims at checking the actions that have been carried out by the ahb master(s) Mi and possibly the ahb slave(s) SLj step by step (or cycle by cycle). So, the interface device D stores in its FIFO memories the master control data and possibly the slave responses and outputs them on its output channels Ii at the end of each step (or cycle). It is recalled that a slave response may be retrieved through the master it works with.

In this mode, the processing module PM outputs the stored data on each rising edge and/or each falling edge of its internal clock, depending on the processing speed. Generally when the processing speed is high, the internal clock period is short and it is only possible to output the stored data on each rising edge of the internal clock.

The tracing mode aims at providing an image of what occurs on one or more bus(es) during a chosen time interval. So, as it is not possible to store every data flowing on the bus(es) during each time interval, these data are momentarily stored in the FIFO memories and retrieved on-the-fly. Moreover, only writes and/or reads of the ahb masters Mi are preferably stored in the FIFO memories, because only master activity is interesting. Moreover the data are stored at a speed higher than the speed at which they are outputted on the output channels Ii. So the interface device D comprises an internal clock working at a low frequency for controlling data retrieval from the FIFO memories and of course FIFO memory clearance.

This tracing mode is not cycle-accurate as the spatial location in time of reads and writes has been removed. This is more precisely the case when the computer system comprises a parallel architecture. Indeed, in this case traces need to be observed in parallel and in real time. So, there is no synchronisation between the different parallel traces.

In this tracing mode, if the FIFO memories are big enough and the clock period low enough, the processing module PM may output the stored data on each rising edge and each falling edge of the clock in order to allow an increase of the bandwidth on each output channel Ii.

The interface device D and notably its processing module PM are typically realised with a combination of hardware modules.

An example of dynamic allocation and reallocation of FIFO memories according to the invention will now be described with reference to FIGS. 2 and 3.

In this example one considers, as it is the case in the example of FIG. 1, that the computer system CS comprises three ahb masters M1, M2 and M3, three static FIFO memories SF1, SF2 and SF3, each assigned to one of the ahb masters Mi, and six dynamic FIFO memories DF1 to DF6 dynamically allocatable and linkable to one another and to the static FIFO memories SFi according to the current needs. Moreover, the static FIFO memories SFi do not have the same size (SF2 being bigger than SF2 and SF3 because ahb master M2 is supposed to have a bigger activity than the two other ahb masters M1 and M3) and the dynamic FIFO memories DFk have the same size. Moreover, output channels I1, I2 and I3 are assigned to the FIFOs assigned to the masters M1, M2 and M3, respectively, for data outputting purposes.

Figures 2, 3:
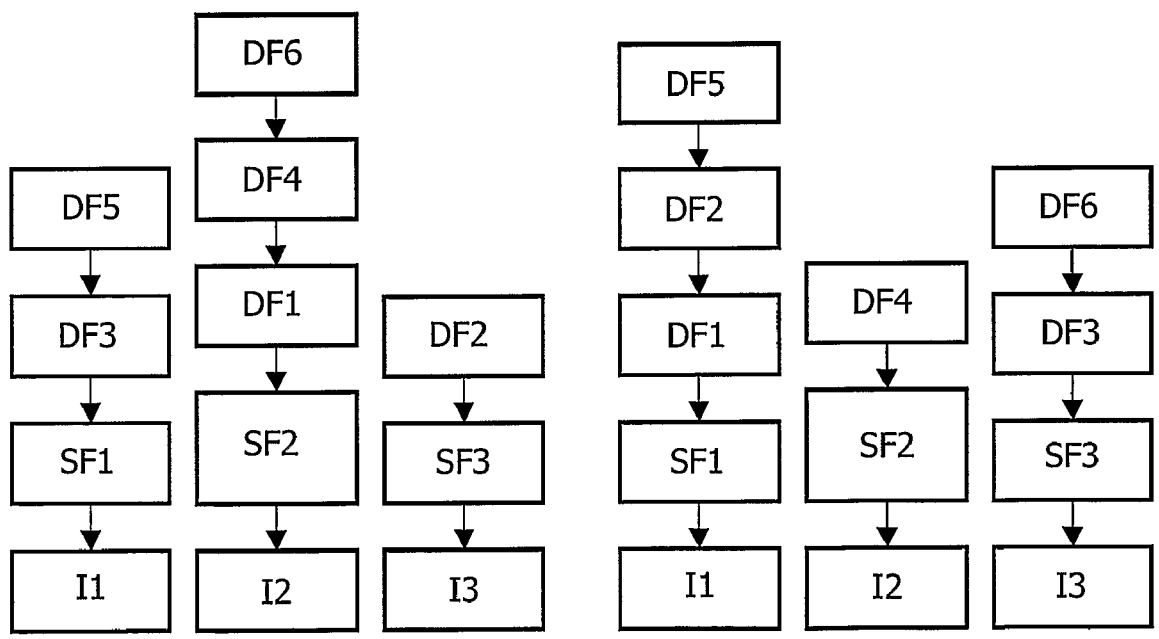

As illustrated in FIG. 2, at a given time the processing module PM of the interface device D has decided to allocate:
the dynamic FIFO memories DF3 and DF5 to the ahb master M1 to complete the static FIFO memory SF1 which has been assigned to it,
the dynamic FIFO memories DF1, DF4 and DF6 to the ahb master M2 to complete the static FIFO memory SF2 which has been assigned to it, and
the dynamic FIFO memories DF2 to the ahb master M3 to complete the static FIFO memory SF3 which has been assigned to it.

This example is representative of a situation where the ahb master M2 has a much more important activity than the two other ahb masters M1 and M3, at a given time.

But, the situation may evolve, therefore compiling the processing module PM to compute new FIFO memory sizes and then to reallocate the different dynamic FIFO memories DFk. An example of such a reallocation is illustrated in FIG. 3. More precisely, in this example the processing module PM of the interface device D has decided to allocate:
the dynamic FIFO memories DF1, DF2 and DF5 to the ahb master M1 to complete the static FIFO memory SF1 which has been assigned to it,
the dynamic FIFO memories DF4 to the ahb master M2 to complete the static FIFO memory SF2 which has been assigned to it, and
the dynamic FIFO memories DF3 and DF6 to the ahb master M3 to complete the static FIFO memory SF3 which has been assigned to it.

In these two examples every dynamic FIFO memory DFk has been allocated, but it may be different in other situations where there are different needs.

It is possible to provide a status register for generating an overflow flag each time an overflow is detected due to an insufficient dynamic FIFO memory size allocation. Indeed this overflow flag allows to notify that the whole activity of the corresponding master has not been stored.

It is also possible to let the user select from a list of signals the one(s) he wants to collect in the FIFO memories. When certain collected signals are mandatory, the signals belonging to the list may be optional ones.

The invention is not limited to the embodiments of interface device and computer system described above only as examples, but it encompasses all alternative embodiments which may be considered by one skilled in the art to be within the scope of the claims hereafter.

Thus, in the preceding description has been described an example of a computer system comprising several masters and several slaves working together. But the invention applies to computer systems comprising at least one master and at least one slave. Nevertheless, if the number of masters and slaves is greater, then the interface device according to the invention is more useful.

The invention claimed is:

1. An interface device for a computer system comprising at least one master working with at least one slave configured to be readable and writable at chosen addresses, each master being configured to execute tasks and to deliver slave addresses for reading and/or writing purposes, wherein the interface device comprises:

a group of first FIFO memories, wherein each first FIFO memory is assigned to one of said masters for storing data representative of executed tasks of the master;
a group of dynamically allocatable second FIFO memories linkable to one another and to said first FIFO memories; and
processing means configured to compute dynamically a FIFO memory size required by each of said masters at a given time, considering the importance of the tasks that the master is executing, and to allocate dynamically a number of second FIFO memories to each of said masters chosen according to the corresponding computed FIFO memory size,
wherein said second FIFO memories have identical sizes, and said processing means is configured to determine the second FIFO memories to be allocated dynamically as a function of a working parameter representative of a processing speed, wherein said processing means is configured, in case of second FIFO memory allocation needs for at least two masters greater than the number of remaining second FIFO memories not yet allocated, to allocate said remaining second FIFO memories to a master for which exceeding of a threshold is detected earliest among the at least one masters during a bus observation window of the computer system.

2. The interface device of claim 1, wherein said processing means is configured to analyse the occupancy rate of each first and second FIFO memory assigned and/or allocated to each of said masters to compute dynamically each required FIFO memory size.

3. The interface device of claim 2, wherein said processing means is configured to analyse said occupancy rates by comparing each of said occupancy rates to a chosen threshold, an allocation of at least a chosen one of said second FIFO memories to a chosen one of said masters being decided when the corresponding occupancy rate is greater than said threshold.

4. The interface device of claim 3, wherein the chosen threshold is equal to 90%.

5. The interface device of claim 1, wherein said processing means is configured to work in tracing mode to store data representative of master control signals in said first and second FIFO memories and to provide stored data on outputs to free the locations that the stored data occupies in said first and second FIFO memories.

6. The interface device of claim 5, wherein said processing means is configured to provide data on each rising edge of an internal clock.

7. The interface device of claim 6, wherein said processing means is configured to provide data on each falling edge of said internal clock.

8. The interface device of claim 1, wherein said processing means is configured to work in a debugging mode to provide data representative of master control signals and slave responses stored in the first and second FIFO memories, for master activity comparison purposes.

9. A computer system, the computer system comprising:
at least one slave configured to be readable and writable at chosen addresses;
at least one master working with the at least one slave, wherein each master is configured to execute tasks and to deliver slave addresses for reading and/or writing purposes; and
the interface device of claim 1.

10. The interface device of claim 1 further comprising a status register configured to generate an overflow flag when an overflow is detected due to an insufficient dynamic FIFO memory size allocation to a master.

11. An interface device for a computer system comprising at least one master working with at least one slave configured to be readable and writable at chosen addresses, each master being configured to execute tasks and to deliver slave addresses for reading and/or writing purposes, wherein the interface device comprises:
a group of first FIFO memories, wherein each first FIFO memory is assigned to one of said masters for storing data representative of executed tasks of the master;
a group of dynamically allocatable second FIFO memories linkable to one another and to said first FIFO memories; and
processing means configured to compute dynamically a FIFO memory size required by each of said masters at a given time, considering the importance of the tasks that the master is executing, and to allocate dynamically a number of second FIFO memories to each of said masters chosen according to the corresponding computed FIFO memory size,
wherein said second FIFO memories have identical sizes, and said processing means is configured to determine the second FIFO memories to be allocated dynamically as a function of a working parameter representative of a processing speed, wherein said processing means is configured, in case of second FIFO memory allocation needs for at least two masters greater than the number of remaining second FIFO memories not yet allocated, to allocate said remaining second FIFO memories to a master that uses the biggest bandwidth among the at least one masters during a bus observation window of the computer system.

12. The interface device of claim 11, wherein said processing means is configured to analyse the occupancy rate of each first and second FIFO memory assigned and/or allocated to each of said masters to compute dynamically each required FIFO memory size.

13. The interface device of claim 12, wherein said processing means is configured to analyse said occupancy rates by comparing each of said occupancy rates to a chosen threshold, an allocation of at least a chosen one of said second FIFO memories to a chosen one of said masters being decided when the corresponding occupancy rate is greater than said threshold.

14. The interface device of claim 11, wherein said processing means is configured to work in a tracing mode to store data representative of master control signals in said first and second FIFO memories and to provide stored data on outputs to free the locations that the stored data occupies in said first and second FIFO memories.

15. The interface device of claim 11, wherein said processing means is configured to work in a debugging mode to provide data representative of master control signals and slave responses stored in the first and second FIFO memories, for master activity comparison purposes.

16. An interface device for a computer system comprising at least one master working with at least one slave configured to be readable and writable at chosen addresses, each master being configured to execute tasks and to deliver slave addresses for reading and/or writing purposes, wherein the interface device comprises:
a group of first FIFO memories, wherein each first FIFO memory is assigned to one of said masters for storing data representative of executed tasks of the master;
a group of dynamically allocatable second FIFO memories linkable to one another and to said first FIFO memories; and
processing means configured to compute dynamically a FIFO memory size required by each of said masters at a given time, considering the importance of the tasks that the master is executing, and to allocate dynamically a number of second FIFO memories to each of said masters chosen according to the corresponding computed FIFO memory size, wherein said processing means is configured, in case of second FIFO memory allocation needs for at least two masters greater than the number of remaining second FIFO memories not yet allocated, to allocate said remaining second FIFO memories according to a combination of two priority mechanisms.

17. The interface device of claim 16, wherein said processing means is configured to analyse the occupancy rate of each first and second FIFO memory assigned and/or allocated to each of said masters to compute dynamically each required FIFO memory size.

18. The interface device of claim 17, wherein said processing means is configured to analyse said occupancy rates by comparing each of said occupancy rates to a chosen threshold, an allocation of at least a chosen one of said second FIFO memories to a chosen one of said masters being decided when the corresponding occupancy rate is greater than said threshold.

19. The interface device of claim 16, wherein said second FIFO memories have identical sizes, and said processing means is configured to determine the second FIFO memories to be allocated dynamically as a function of a working parameter representative of a processing speed.

20. The interface device of claim 16, wherein said processing means is configured to work in a tracing mode to store data representative of master control signals in said first and second FIFO memories and to provide stored data on outputs to free the locations that the stored data occupies in said first and second FIFO memories.

* * * * *